United States Patent
Koskinen et al.

(10) Patent No.: US 12,484,105 B2
(45) Date of Patent: Nov. 25, 2025

(54) DEVICES, METHODS AND APPARATUSES FOR DATA TRANSMISSION

(71) Applicant: NOKIA TECHNOLOGIES OY, Espoo (FI)

(72) Inventors: Jussi-Pekka Koskinen, Oulu (FI); Samuli Heikki Turtinen, Ii (FI); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/973,703

(22) Filed: Dec. 9, 2024

(65) Prior Publication Data

US 2025/0106930 A1  Mar. 27, 2025

Related U.S. Application Data

(63) Continuation-in-part of application No. PCT/CN2022/133030, filed on Nov. 18, 2022.

(51) Int. Cl.
*H04W 76/20* (2018.01)
*H04W 72/04* (2023.01)
*H04W 76/19* (2018.01)

(52) U.S. Cl.
CPC ........... *H04W 76/20* (2018.02); *H04W 72/04* (2013.01); *H04W 76/19* (2018.02)

(58) Field of Classification Search
CPC ...... H04W 76/20; H04W 72/04; H04W 76/19
See application file for complete search history.

(56) References Cited

U.S. PATENT DOCUMENTS

| | | | |
|---|---|---|---|
| 2022/0007422 A1 | 1/2022 | Zhang | |
| 2022/0210868 A1 | 6/2022 | Park et al. | |
| 2023/0217532 A1* | 7/2023 | Kim | H04W 74/0833 |
| | | | 455/458 |
| 2023/0309081 A1* | 9/2023 | Huang | H04W 68/02 |
| 2023/0379881 A1* | 11/2023 | Zhang | H04W 72/04 |
| 2024/0292467 A1* | 8/2024 | Futaki | H04W 76/20 |
| 2024/0349238 A1* | 10/2024 | Lin | H04W 68/005 |
| 2024/0365157 A1* | 10/2024 | Lin | H04W 72/04 |
| 2025/0056646 A1* | 2/2025 | Yue | H04W 76/20 |

FOREIGN PATENT DOCUMENTS

| | | |
|---|---|---|
| CN | 113891486 A | 1/2022 |
| CN | 115297510 A | 11/2022 |
| WO | WO 2022/192124 A1 | 9/2022 |

OTHER PUBLICATIONS

Intel Corporation, "MT-SDT mechanism", 3GPP TSG RAN WG2 Meeting #120, R2-2212186, (Nov. 14-18, 2022), 6 pages.

(Continued)

*Primary Examiner* — Will W Lin
(74) *Attorney, Agent, or Firm* — ALSTON & BIRD LLP

(57) ABSTRACT

Embodiments of the present disclosure disclose devices, methods and apparatuses for small data transmission (SDT). A terminal device receives, from a network device, an indication message indicating the terminal device to initiate a mobile terminated SDT (MT-SDT). Moreover, the terminal device indicates an access reason of a connection attempt to the network device based on an operation status of the connection attempt.

23 Claims, 6 Drawing Sheets

(56) References Cited

OTHER PUBLICATIONS

International Search Report and Written Opinion for Patent Cooperation Treaty Application No. PCT/CN2022/133030 dated Aug. 10, 2023, 10 pages.
RAN2 VC, "New WID on MT-SDT", 3GPP TSG RAN Meeting #94e, RP-212726, (Dec. 6-17, 2021), 4 pages.
T-Mobile USA, "Discussion on MT-Small Data Transmission", 3GPP TTSG RAN WG2 Meeting #120, R2-2211283, (Nov. 14-18, 2022), 3 pages.
Extended European Search Report for European Application No. 22965599.8 dated Jun. 27, 2025, 11 pages.

\* cited by examiner

DEVICES, METHODS AND APPARATUSES FOR DATA TRANSMISSION

CROSS-REFERENCE TO RELATED APPLICATIONS

This application is a continuation-in-part of 371 International Application No. PCT/CN2022/133030, filed Nov. 18, 2022, the entire contents of which are incorporated herein by reference.

FIELD

Embodiments of the present disclosure generally relate to the field of communication, and in particular, to devices, methods, apparatuses and computer readable storage medium for data transmission for example small data transmission (SDT).

BACKGROUND

In communication technologies, there is a constant evolution ongoing in order to provide efficient and reliable solutions for utilizing wireless communication networks. Currently, efforts have been made to develop 5th generation (5G) or 5G advance wireless system. The new wireless systems can support various types of service applications for terminal devices.

In the current wireless system, to avoid signaling overhead and delay associated with mode transition of a terminal device, such as user equipment (UE) from an inactive mode (for example, a radio resource control (RRC) inactive state, also denoted as RRC_inactive state) to a connected mode (for example, an RRC_connected state), a transmission scheme called SDT has been proposed to facilitate data transmission. In the SDT procedure, data interaction between a base station and UE may be achieved, while the UE is still in the RRC_inactive state during the data transmission. However, enhancements on SDT are still in further investigation.

SUMMARY

In general, example embodiments of the present disclosure provide devices, methods, apparatuses and computer readable storage medium for SDT.

In a first aspect, there is provided a terminal device. The terminal device comprises one or more transceivers; and one or more processors communicatively coupled to the one or more transceivers, and the one or more processors are configured to cause the terminal device to: receive, from a network device, an indication message indicating the terminal device to initiate a mobile terminated small data transmission (MT-SDT); and indicate an access reason of a connection attempt to the network device based on an operation status of the connection attempt.

In a second aspect, there is provided a network device. The network device comprises one or more transceivers; and one or more processors communicatively coupled to the one or more transceivers, and the one or more processors are configured to cause the network device to: transmit, to a terminal device, an indication message indicating the terminal device to initiate a mobile terminated small data transmission (MT-SDT); and receive, from the terminal device, an indication of an access reason of a connection attempt to the network device.

In a third aspect, there is provided a method implemented at a terminal device. The method comprises: receiving, from a network device, an indication message indicating the terminal device to initiate a mobile terminated small data transmission (MT-SDT); and indicating an access reason of a connection attempt to the network device based on an operation status of the connection attempt.

In a fourth aspect, there is provided a method implemented at a network device. The method comprises: transmitting, to a terminal device, an indication message indicating the terminal device to initiate a mobile terminated small data transmission (MT-SDT); and receiving, from the terminal device, an indication of an access reason of a connection attempt to the network device.

In a fifth aspect, there is provided an apparatus of a terminal device. The apparatus comprises: means for receiving, from a network device, an indication message indicating the terminal device to initiate a mobile terminated small data transmission (MT-SDT); and means for indicating an access reason of a connection attempt to the network device based on an operation status of the connection attempt.

In a sixth aspect, there is provided an apparatus of a network device. The apparatus comprises: means for transmitting, to a terminal device, an indication message indicating the terminal device to initiate a mobile terminated small data transmission (MT-SDT); and means for receiving, from the terminal device, an indication of an access reason of a connection attempt to the network device.

In a seventh aspect, there is provided a terminal device. The terminal device comprises at least one processor; and at least one memory including computer program codes, wherein the at least one memory and the computer program codes are configured to, with the at least one processor, cause the terminal device to: receive, from a network device, an indication message indicating the terminal device to initiate a mobile terminated small data transmission (MT-SDT); and indicate an access reason of a connection attempt to the network device based on an operation status of the connection attempt.

In an eighth aspect, there is provided a network device. The network device comprises at least one processor; and at least one memory including computer program codes, wherein the at least one memory and the computer program codes are configured to, with the at least one processor, cause the network device to: transmit, to a terminal device, an indication message indicating the terminal device to initiate a mobile terminated small data transmission (MT-SDT); and receive, from the terminal device, an indication of an access reason of a connection attempt to the network device.

In a ninth aspect, there is provided a non-transitory computer readable medium comprising program instructions for causing an apparatus to perform at least the method according to third or fourth aspect.

In a tenth aspect, there is provided a computer program comprising instructions, which, when executed by an apparatus at a terminal device, cause the apparatus at least to: receive, from a network device, an indication message indicating the terminal device to initiate a mobile terminated small data transmission (MT-SDT); and indicate an access reason of a connection attempt to the network device based on an operation status of the connection attempt.

In an eleventh aspect, there is provided a computer program comprising instructions, which, when executed by an apparatus at a network device, cause the apparatus at least to: transmit, to a terminal device, an indication message indicating the terminal device to initiate a mobile terminated small data transmission (MT-SDT); and receive, from the terminal device, an indication of an access reason of a connection attempt to the network device.

In a twelfth aspect, there is provided a terminal device. The terminal device comprises receiving circuitry configured to receive, from a network device, an indication message indicating the terminal device to initiate a mobile terminated small data transmission (MT-SDT); and initiating circuitry configured to indicate an access reason of a connection attempt to the network device based on an operation status of the connection attempt.

In a thirteenth aspect, there is provided a network device. The network device comprises transmitting circuitry configured to transmit, to a terminal device, an indication message indicating the terminal device to initiate a mobile terminated small data transmission (MT-SDT); and receiving circuitry configured to receive, from the terminal device, an indication of an access reason of a connection attempt to the network device.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
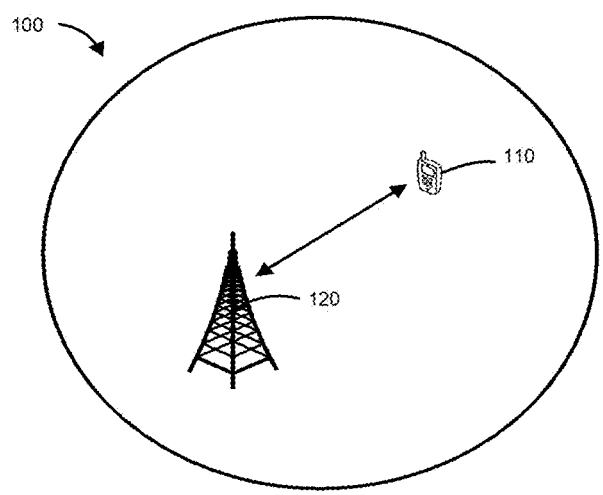
FIG. 1 illustrates an example network environment in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as long term evolution (LTE), LTE-advanced (LTE-A), wideband code division multiple access (WCDMA), high-speed packet access (HSPA), narrow band internet of things (NB-IoT) and so on. Furthermore, the communications between a terminal device and a network device in the communication network may be performed according to any suitable generation communication protocols, including, but not limited to, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a new radio (NR) NB (also referred to as a gNB), a remote radio unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As stated above, the SDT has been proposed to facilitate data transmission. In an SDT procedure, data transmission can be allowed while the terminal device such as UE still remains in the RRC_inactive mode, i.e. without transitioning to the RRC_connected mode.

In release 17 (Rel-17), mobile-originated (MO)-SDT is enabled on a radio bearer basis and is initiated by the UE. The MO-SDT allows small packet transmission for uplink (UL)-oriented packets. Further, it is discussed that the initiation of a MO-SDT procedure should fulfill some conditions. That is, the MO-SDT procedure can be initiated only if less than a configured/predetermined amount of UL data awaits transmission across all radio bearers for which the SDT is enabled, measured reference signal received power (RSRP) in a cell is above a configured/predetermined threshold, and a valid resource for SDT is available.

For downlink (DL), small packet transmission for DL-triggered packets should be also considered, for the reason that the MT-SDT can achieve similar benefits as the MO-SDT. The SDT for DL may be called as mobile-terminated (MT)-SDT, which may reduce signaling overhead and UE power consumption by keeping in an RRC_inactive state or reduce latency by allowing fast transmission of small and infrequent packets, e.g. for positioning.

In release 18 (Rel-18), the following objectives have been discussed in the radio access network (RAN) for Rel-18 SDT work item [RP-212726].

---

Specify the support for paging-triggered SDT (MT-SDT) [RAN2, RAN3]

---

MT-SDT triggering mechanism for UEs in RRC_inactive, supporting RA-SDT and CG-SDT as the UL response; MT-SDT procedure for initial DL data reception and subsequent UL/DL data transmissions in RRC_inactive.

---

The MT-SDT can be triggered by the network. For example, a paging message with an MT-SDT indication may be used by the network to trigger the MT-SDT. Similarly, the initiation of an MT-SDT procedure should fulfill some conditions. At the UE side, it will check a validity of certain conditions for the MT-SDT. In case of the condition for the MT-SDT being not fulfilled, the UE is not allowed to initiate an SDT procedure. In such a case, another procedure such as a non-SDT resume procedure or a regular connection establishment procedure can be initiated.

However, the inventors have noticed that different from MO-SDT, the network does not know the reason why the UE fails to initiate the MT-SDT procedure, which otherwise would be used by the network to optimize communications with the UE.

In view of the above, enhancements on the SDT procedure especially for the failure of an SDT initiation shall be considered. Therefore, there is a need for improved solutions for the SDT, especially the MT-SDT, between the UE and network side.

Thus, embodiments of the present disclosure provide a solution for SDT. In this solution, a terminal device receives, from a network device, an indication message indicating the terminal device to initiate an MT-SDT. Moreover, the terminal device indicates an access reason of a connection attempt to the network device based on an operation status of the connection attempt. Accordingly, the network device receives an indication of the access reason of the connection attempt.

By indicating the access reason of the connection attempt to the network device, it makes it possible for the network device to know for what reason the terminal device is attempting the connection after paging for the MT-SDT. The network device may further use connection reason information for prioritizing connection attempts, for the terminal device or between different terminal devices. Thus, it is allowed to improve communication efficiency.

As used herein, "MT-SDT" may refer to a network-originated DL SDT procedure. In the MT-SDT, the network device transmits a paging message to indicate the terminal device to initiate an SDT. Then, the network device transmits DL small data without bringing the terminal device to the RRC_connected state.

As used herein, "an SDT resume procedure" may refer to a procedure allowing data and/or signalling transmission while remaining in an RRC_inactive state (i.e. without transitioning to RRC_connected state). SDT is enabled on a radio bearer basis and is initiated by the UE only if less than a configured amount of UL data awaits transmission across all radio bearers for which SDT is enabled, the DL RSRP is above a configured threshold, and a valid SDT resource is available.

As used herein "a non-SDT resume procedure" may refer to an RRC Setup or RRC Resume procedure. In the non-SDT resume procedure, the terminal device may transmit an RRC resume request or RRC setup request. The purpose of the RRC Resume procedure is to resume a suspended RRC connection, including resuming signal radio bearer (SRB) (s), data radio bearer (DRB) (s) and multicast radio bearer (MRB) (s) or performing an RNA update. The purpose of the RRC setup procedure is to establish an RRC connection. RRC connection establishment involves SRB1 establishment. The procedure is also used to transfer the initial NAS dedicated information/message from the UE to the network.

As used herein "a regular connection establishment procedure" may refer to a procedure for initiating a non-SDT transmission including a connection establishment procedure, an RRC Setup procedure or an RRC Resume procedure.

Hereinafter, principle and embodiments of the present disclosure will be described in detail below with reference to the accompanying drawings. Reference is first made to FIG. 1, which illustrates an example network environment 100 in which example embodiments of the present disclosure can be implemented.

The network environment 100, which may be a part of a communication network, comprises a terminal device 110 and a network device 120 communicating with each other or with other devices via each other.

The network environment 100 may comprise any suitable number of devices and cells. In the network environment 100, the terminal device 110 and the network device 120 can communicate data and control information with each other. A link from the network device 120 to the terminal device 110 is referred to as a DL, while a link from the terminal device 110 to the network device 120 is referred to as a UL.

It is to be understood that the number of the terminal device 120, and the number of the network device 110 as shown in the communication network environment 100 are only for the purpose of illustration, without any limitation to the scope of the present disclosure. In some example embodiments, the communication network environment 100 may include any number of terminal devices, and/or any number of network devices.

It is to be understood that two devices are shown in the network environment 100 only for the purpose of illustration, without suggesting any limitation to the scope of the present disclosure. In some example embodiments, the network environment 100 may comprise a further device to communicate with the terminal device 110 and network device 120.

The communications in the network environment 100 may follow any suitable communication standards or protocols, which are already in existence or to be developed in the future, such as universal mobile telecommunications system (UMTS), long term evolution (LTE), LTE-advanced (LTE-A), the fifth generation (5G) New Radio (NR), the sixth generation (6G) or beyond, wireless fidelity (Wi-Fi) and worldwide interoperability for microwave access (WiMAX) standards, and employs any suitable communication technologies, including, for example, multiple-input multiple-output (MIMO), orthogonal frequency division multiplexing (OFDM), time division multiplexing (TDM), frequency division multiplexing (FDM), code division multiplexing (CDM), bluetooth, ZigBee, and machine type communication (MTC), enhanced mobile broadband (eMBB), massive machine type communication (mMTC), ultra-reliable low latency communication (URLLC), carrier aggregation (CA), dual connectivity (DC), and new radio unlicensed (NR-U) technologies.

In some example embodiments, the network device 120 may transmit, to the terminal device 110, an indication message indicating the terminal device 110 to initiate an MT-SDT. Then, the terminal device 110 may determine whether it can initiate the MT-SDT based on predetermined conditions. On this basis, the terminal device 110 may indicate an access reason of a connection attempt to the network device 120 based on an operation status of the connection attempt.

Figure 2:
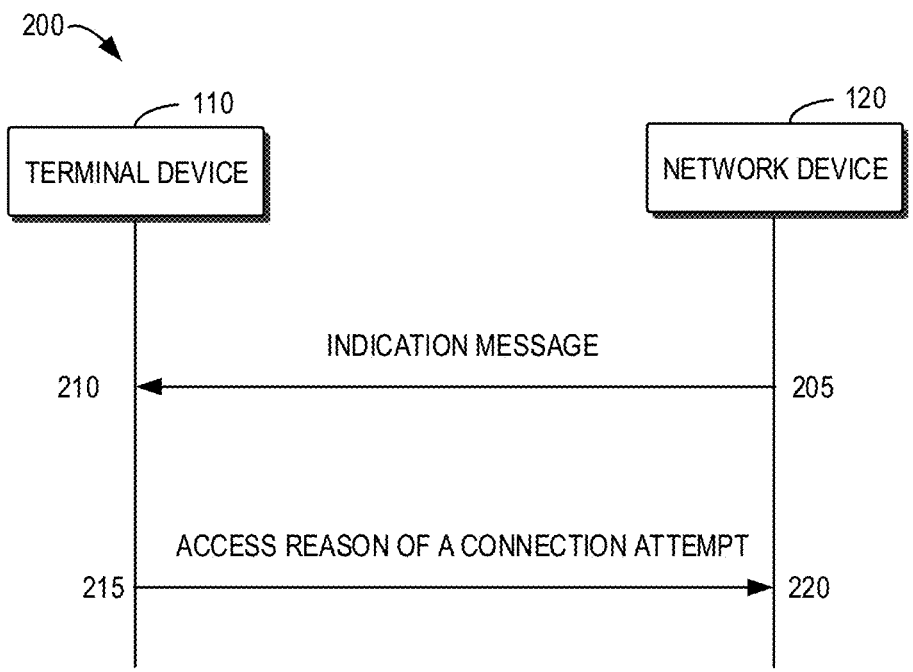
FIG. 2 illustrates an example signaling flow between the terminal device and the network device according to some example embodiments of the present disclosure.

FIG. 2 illustrates an example signaling flow 200 between the terminal device 110 and the network device according to some example embodiments of the present disclosure. For the purpose of discussion, the signaling flow 200 will be described with reference to FIG. 1.

As shown in FIG. 2, the network device 120 transmits (205), to the terminal device 110, an indication message indicating the terminal device 110 to initiate an MT-SDT. Accordingly, the terminal device 110 receives (210), from the network device 120, the indication message. For example, the indication message may comprise a paging message indicating the terminal device 110 to trigger or initiate an MT-SDT procedure.

Then, the terminal device 110 may determine whether the MT-SDT can be initiated to decide which kind of connection attempt could be made. For example, the terminal device 110 may determine whether the MT-SDT can be initiated based on a predetermined condition for the MT-SDT. As an example, the condition for the MT-SDT may be associated with one or more of an RSRP threshold, time advice (TA) validity, a DRB configured for SDT, a predetermined data volume (e.g. a threshold for SDT) related to UL data arrival in the terminal device 110, etc. For example, if the RSRP is lower than the RSRP threshold, it may be not suitable to perform the MT-SDT and the terminal device may determine that the condition for the MT-SDT was not met. For another example, if the TA value is not invalid any more, it may require obtaining the new TA value and thus is unsuitable for the MT-SDT either, and in turn determine that the condition for the MT-SDT is not met. As a further example if DRB is not the DRB configured for SDT, the terminal device 110 may determine that the condition for the MT-SDT is not met. Additionally or alternatively, if the data volume to be transmitted in the buffer of the terminal device 110 is more than a predetermined data volume (i.e., the data volume is too large, it may be unsuitable for the MT-SDT transmission), the terminal device 110 may determine that the condition for the MT-SDT is not met. On the other hand, if for example all conditions are met, the terminal device may determine that the condition for the MT-SDT is met.

If the predetermined condition for the MT-SDT is fulfilled, the terminal device 110 may determine that the MT-SDT may be initiated. Otherwise, the terminal device 110 may determine that a non-SDT procedure or a regular connection establishment procedure may be initiated, which may for example depend on the state of terminal device 110, for example whether the terminal device 110 is in an RRC_inactive state or an RRC_idle state.

The terminal device 110 indicates (215) an access reason of a connection attempt to the network device 120 based on an operation status of the connection attempt. Accordingly, the network device 120 receives (220), from the terminal device 110, an indication of the access reason of the connection attempt.

The operation status may include for example a fulfillment situation/status of a condition for the MT-SDT; or types of resources available for the connection attempt. For example, the operation status may include whether the predetermined condition for the MT-SDT is fulfilled, what kind of the connection attempt is made, what kind of resource may be used for the determined connection attempts, etc. Based on the operations status, the access reason of the connection attempt may be determined.

In some example embodiments, the access reason may comprise one or more of: a condition for the MT-SDT was not fulfilled, the connection attempt for the MT-SDT failed, an MT access, or an MT-SDT. In some example embodiments, the access reason may also be referred to as an access purpose. For the reasons that the condition for the MT-SDT was not fulfilled, it is also possible to report the specific access reasons, for example the RSRP power is low, the TA is invalid, the DRB is not allowed for MT-SDT, or the data volume in the buffer of the terminal device 110 is large.

In some example embodiments, the terminal device 110 may determine the access reason based on the operation status in a variety of approaches. For example, the operation status may comprise a fulfillment situation of a condition for the MT-SDT. In this case, for example, the access reason may be determined as an MT-SDT, if the condition for the MT-SDT is fulfilled. Otherwise, if the condition for the MT-SDT is not fulfilled, an MT access or an MT-SDT may be performed and in such a case, the access reason may be determined as an MT access or an MT-SDT.

Alternatively or additionally, if the condition for the MT-SDT is not fulfilled, the access reason may also comprise "the condition for the MT-SDT was not fulfilled".

As another example, the operation status may comprise types of resources available for the connection attempt. For example, the resources available for the connection attempt may comprise resources intended for SDT, such as resources for configured grant SDT (CG-SDT), or resources for random access (RA-SDT). Alternatively or additionally, the resources available for the connection attempt may comprise common random access channel (RACH) resources.

For example, the access reason may be determined as an MT-SDT, if the resources for CG-SDT or the resources for RA-SDT are used. If the common RACH resources are used, the access reason may be determined as an MT access or an MT-SDT.

Alternatively or additionally, if the connection attempt for the MT-SDT may be failed, the access reason may comprise "the connection attempt for the MT-SDT failed". In some embodiments, the connection attempt for the MT-SDT failed may mean the condition for the MT-SDT is met but the SDT connection attempts fails, which may be caused by for example bad channel quality or other reasons.

Alternatively or additionally, if the terminal device 110 initiates the connection attempt for the MT-SDT but the connection attempt for the MT-SDT failed, for some other reasons, the terminal device 110 may then determine to initiate an MT access. In this case, the access reason may comprise an MT access.

In some example embodiments, the terminal device 110 may indicate the access reason to the network device 120 only when the terminal device 110 fails to initiate the MT-SDT, for example, if the condition for the MT-SDT is not fulfilled or the connection attempt fails. For example, the access reason may include any of the conditions for the MT-SDT was not fulfilled or the connection attempt failed. As a further example, the access reason may also include more specific reasons, such as, which one or ones of the conditions for the MT-SDT is (are) not fulfilled, for example, which one of an RSRP threshold, time advice (TA) validity, a DRB configured for SDT, a predetermined data volume (e.g. a threshold for SDT) related to UL data arrival in the terminal device 110 is not fulfilled.

In some example embodiments, the connection attempt may comprise one of an SDT resume procedure, a non-SDT resume procedure, or a connection establishment procedure. As mentioned above, the SDT resume procedure may refer to a procedure for initial first SDT, the non-SDT resume procedure may refer to a procedure for the terminal device 110 in an inactive state to initiate the non-SDT operation, a connection establishment procedure may refer to a regular connection establishment procedure for the terminal device 110 in an idle state to initiate a regular data transmission (i.e., non-SDT).

For example, the terminal device 110 may initiate an SDT resume procedure, for example, if the condition for the MT-SDT is fulfilled. Then, the MT-SDT operation may be performed without a need to bring the terminal device 110 to the RRC_connected state.

As another example, if the terminal device 110 is in the RRC_inactive state and determines that the initiation of the MT-SDT fails, for example for the reason that the condition for the MT-SDT is not met, the terminal device 110 may initiate a non-SDT resume procedure, for example transmit a non-SDT resume request.

In such a case, the network device 120 may respond to the non-SDT request by transmitting an indication to the terminal device 110 to bring the terminal device 110 to the RRC connected state. In this case, the network device may bring the terminal device 110 to a connected state for a non-SDT transmission. The network device may trigger the RRC state change by transmitting a trigger indication.

At the terminal side, if the terminal device 110 receives such a trigger indication, the terminal device 110 may then initiate the connection through a connection establishment procedure. In other words, the terminal device 110 may initiate the connection establishment procedure (triggered by the network device) after indicating the access reason to the network device.

As still a further example, an SDT resume procedure may be first initiated by the terminal device 110 as the connection attempt. But if the condition for the MT-SDT is not fulfilled later, the terminal device 110 may continue the connection attempt as a non-SDT RRC resume procedure.

For example, the network device 120 may consider the connection attempts still as an SDT attempt, if the access reason indicates the MT-SDT. As another example, if the access reason indicates the condition for the MT-SDT is not fulfilled, the network device may respond to a SDT resume request already transmitted from the terminal device 110 as a non-SDT RRC resume request, to move the terminal device 110 to a connected mode, for example, an RRC_connected state. The network device may transmit an indication to the terminal device 110 as a response to the transmitted SDT resume request to bring the terminal device 110 to the connected mode.

As yet a further example, the terminal device 110 may first initiate an SDT resume procedure as the connection attempt, and then if it is determined that the condition for the MT-SDT is not fulfilled later, the terminal device 110 may stop the SDT resume procedure and initiate another procedure, i.e., a new non-SDT resume procedure, by for example transmitting a non-SDT resume request. In such a case, upon reception of the non-SDT resume request, the network device may respond to the non-SDT resume request and bring the UE to the RRC_connected state.

Alternatively or additionally, if the condition for the MT-SDT is not fulfilled, the terminal device 110 may determine to enter an idle mode, for example, an RRC_idle state. Then, the terminal device 110 may initiate a connection establishment procedure.

Alternatively or additionally, the terminal device 110 may use for example an SDT access as the access reason if the condition for the MT-SDT is fulfilled. In another example, the terminal device 110 may use for example an MT access as the access reason if the condition for the MT-SDT is not fulfilled. The network device 120 may then determine whether to bring the terminal device 110 to a connected mode or not based on the access reason, even though MT-SDT has been indicated in the paging message to the terminal device 110.

Accordingly, the access reason may be indicated in an RRC setup request, for example, if a connection establishment procedure is initiated. As a further example, the access reason may be indicated in an RRC resume request in either SDT resume procedure or a non-SDT resume procedure. Alternatively or in addition, the access reason may be indicated in UE assistance information.

In some embodiments, the network device may use the access reasons to adjust the transmission configuration for the MT-SDT of the terminal device 110. For example, it may perform a plurality of transmissions for the terminal device 110 if the RSRP is low or further configure more DRB for the MT-SDT, etc.

In some example embodiments, a plurality of terminal devices initiate a plurality of connection attempts to the network device, the network device 110 may prioritize the plurality of connection attempts from the plurality of terminal devices based on access reasons of the plurality of connection attempts. The plurality of terminal devices may include the terminal device 110. Based on the access reasons, it may prioritize for the resource scheduling for the plurality of connection attempts.

In some example embodiments, the network device 120 may prioritize connection attempts from a plurality of connection attempts based on access reasons of the connection attempts.

In some example embodiments, the network device 120 may prioritize connection attempts from a plurality of connection attempts based on the critical levels of the connection attempts. For example, the network device 120 may handle connection attempts from the plurality of connection attempts based on access reasons of the connection attempts in a manner that more critical connection attempts are prioritized over less critical connection attempts.

Figure 3:
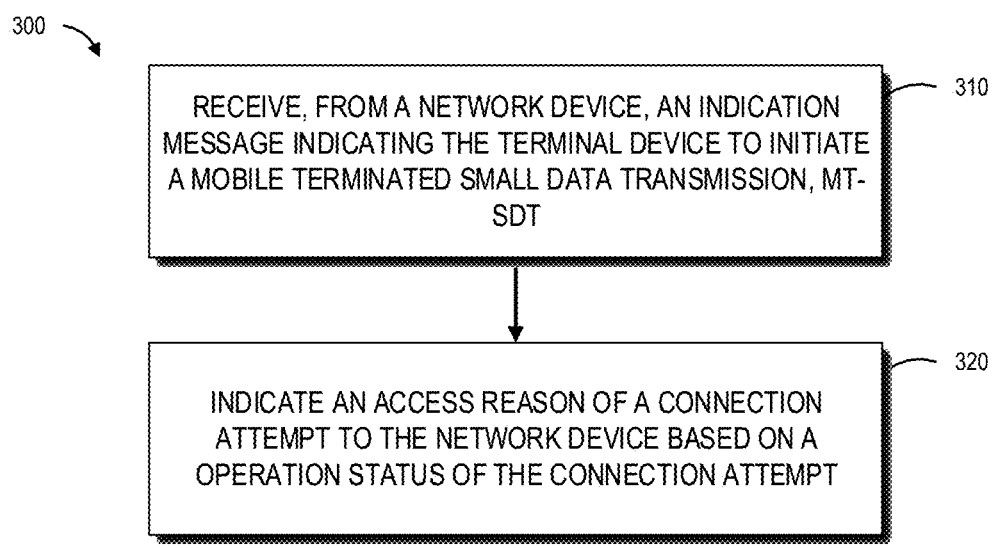
FIG. 3 illustrates an example flowchart of a method implemented at a terminal device according to example embodiments of the present disclosure.

FIG. 3 illustrates an example flowchart of a method 300 implemented at a terminal device according to example embodiments of the present disclosure. For the purpose of discussion, the method 300 will be described from the perspective of the terminal device 110 with reference to FIG. 1.

At 310, the terminal device 110 receives, from a network device 120, an indication message indicating the terminal device 110 to initiate a mobile terminated small data transmission (MT-SDT). At 320, the terminal device 110 indicates an access reason of a connection attempt to the network device 120 based on an operation status of the connection attempt.

In some example embodiments, the access reason may comprise one or more of: a condition for the MT-SDT was not fulfilled; the connection attempt for the MT-SDT failed; a mobile terminated (MT) access; or an MT-SDT.

In some example embodiments, the terminal device 110 further determines the access reason based on the operation status, wherein the operation status comprises one or more of: a fulfillment situation of a condition for the MT-SDT; or types of resources available for the connection attempt.

In some example embodiments, the resources available for the connection attempt may comprise one or more of: resources for configured grant SDT (CG-SDT); resources for random access (RA-SDT); or common random access channel (RACH) resources.

In some example embodiments, the access reason may be determined as: an MT-SDT, if the resources for CG-SDT or the resources for RA-SDT are used; or an MT access or an MT-SDT, if the common RACH resources are used.

In some example embodiments, the access reason may be determined as: an MT-SDT, if the condition for the MT-SDT is fulfilled; or an MT access or an MT-SDT, if the condition for the MT-SDT is not fulfilled.

In some example embodiments, the connection attempt may comprise one of: an SDT resume procedure; a non-SDT resume procedure; or a connection establishment procedure.

In some example embodiments, the terminal device 110 may further initiate the connection establishment procedure after indicating the access reason to the network device 120, wherein the connection establishment procedure is triggered by the network device to bring the terminal device to a connected state.

In some example embodiments, the terminal device 110 may further initiate an SDT resume procedure as the connection attempt; and continue the connection attempt as a non-SDT resume procedure if the condition for the MT-SDT is not fulfilled.

In some example embodiments, the terminal device 110 may further initiate an SDT resume procedure as the connection attempt; and stop the SDT resume procedure and initiate a non-SDT resume procedure if the condition for the MT-SDT is not fulfilled.

In some example embodiments, the terminal device 110 may further enter an idle mode if the condition for the MT-SDT is not fulfilled; and initiate a connection establishment procedure.

In some example embodiments, the terminal device 110 may further enter to a connected state upon receiving a response to any of an SDT resume procedure, a non-SDT resume procedure, or a connection establishment procedure from the network device.

In some example embodiments, the access reason may be indicated in one of: a radio access control, RRC, setup request; an RRC resume request; or UE assistance information. In some example embodiments, the indication message may comprise a paging message indicating the terminal device 110 to trigger or initiate the MT-SDT.

All operations and features as described above with reference to FIG. 2 are likewise applicable to the method 300 and have similar effects. For the purpose of simplification, the details will be omitted.

Figure 4:
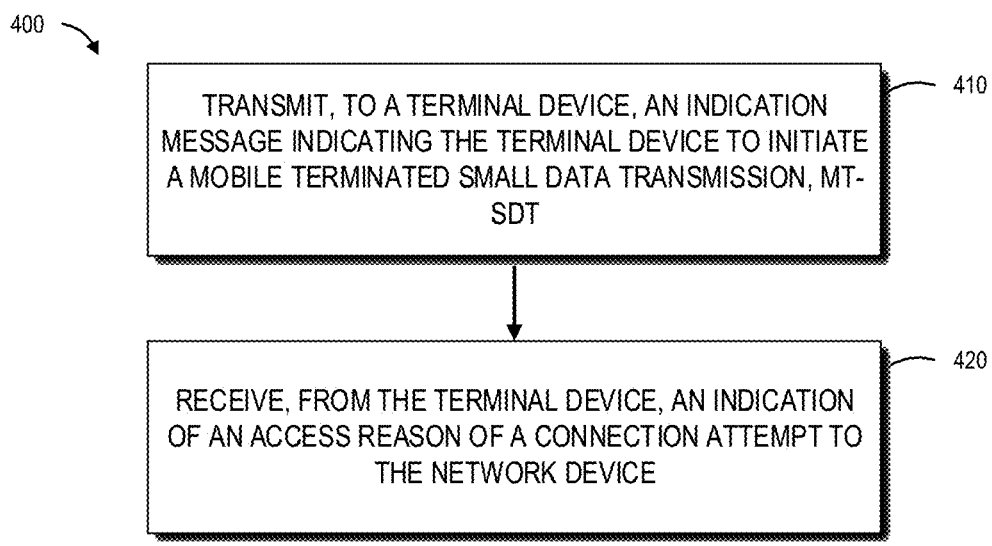
FIG. 4 illustrates an example flowchart of a method implemented at a network device according to example embodiments of the present disclosure.

FIG. 4 shows a flowchart of an example method 400 implemented at a network device according to example embodiments of the present disclosure. For the purpose of discussion, the method 400 will be described from the perspective of the network device 120 with reference to FIG. 1.

At 410, the network device 120 transmits, to a terminal device 110, an indication message indicating the terminal device 110 to initiate a mobile terminated small data transmission (MT-SDT). At 420, the network device receives, from the terminal device 110, an indication of an access reason of a connection attempt to the network device 120.

In some example embodiments, the access reason may comprise one or more of: a condition for the MT-SDT was not fulfilled; the connection attempt for the MT-SDT failed; a mobile terminated (MT) access; or an MT-SDT.

In some example embodiments, the connection attempt may comprise one of: an SDT resume procedure; a non-SDT resume procedure; or a connection establishment procedure.

In some example embodiments, the indication of the access reason is comprised in one of: a radio access control, RRC, setup request; an RRC resume request; or UE assistance information.

In some example embodiments, the network device 120 may further determine whether to bring the terminal device 110 to a connected mode or not based on the access reason; and transmit, to the terminal device 110, an indication to bring the terminal device 110 to the connected mode.

In some example embodiments, the indication message may comprise a paging message indicating the terminal device 110 to trigger or initiate the MT-SDT.

In some example embodiments, the network device 120 may further prioritize a plurality of connection attempts from a plurality of terminal devices based on access reasons of the plurality of connection attempts, wherein the plurality of terminal devices comprise the terminal device 110.

In some example embodiments, the network device 120 may further prioritize connection attempts from a plurality of connection attempts based on the access reasons of the connection attempts.

In some example embodiments, the network device 120 may further handle connection attempts from the plurality of connection attempts based on the access reasons of the connection attempts, wherein the connection attempts are prioritized based on their respective critical degree.

All operations and features as described above with reference to FIG. 2 are likewise applicable to the method 400 and have similar effects. For the purpose of simplification, the details will be omitted.

In some example embodiments, an apparatus capable of performing any of operations of the method 300 (for example, the terminal device 110) may include means for performing the respective steps of the method 300. The means may be implemented in any suitable form. For example, the means may be implemented in a circuitry or software module.

In some example embodiments, the apparatus may include means for receiving, from a network device, an indication message indicating the terminal device to initiate a mobile terminated small data transmission (MT-SDT); and means for indicating an access reason of a connection attempt to the network device based on an operation status of the connection attempt.

In some example embodiments, the access reason comprises one or more of: a condition for the MT-SDT was not fulfilled; the connection attempt for the MT-SDT failed; a mobile terminated (MT) access; or an MT-SDT.

In some example embodiments, the apparatus further comprises means for determining the access reason based on the operation status, wherein the operation status comprises one or more of: a fulfillment situation of a condition for the MT-SDT; or types of resources available for the connection attempt.

In some example embodiments, the resources available for the connection attempt may comprise one or more of: resources for configured grant SDT (CG-SDT); resources for random access (RA-SDT); or common random access channel (RACH) resources.

In some example embodiments, the access reason may be determined as: an MT-SDT, if the resources for CG-SDT or the resources for RA-SDT are used; or an MT access or an MT-SDT, if the common RACH resources are used.

In some example embodiments, the access reason may be determined as: an MT-SDT, if the condition for the MT-SDT is fulfilled; or an MT access or an MT-SDT, if the condition for the MT-SDT is not fulfilled.

In some example embodiments, the connection attempt may comprise one of: an SDT resume procedure; a non-SDT resume procedure; or a connection establishment procedure.

In some example embodiments, the apparatus further comprises means for initiating the connection establishment procedure after indicating the access reason to the network device, wherein the connection establishment procedure is triggered by the network device to bring the terminal device to a connected state.

In some example embodiments, the apparatus may further comprise means for initiating an SDT resume procedure as the connection attempt; and means for continuing the connection attempt as a non-SDT resume procedure if the condition for the MT-SDT is not fulfilled.

In some example embodiments, the apparatus may further comprise means for initiating an SDT resume procedure as the connection attempt; and means for stopping the SDT resume procedure and means for initiating a non-SDT resume procedure if the condition for the MT-SDT is not fulfilled.

In some example embodiments, the apparatus may further comprise means for entering an idle mode if the condition for the MT-SDT is not fulfilled; and means for initiating a connection establishment procedure.

In some example embodiments, the apparatus may further comprise means for entering to a connected state upon receiving a response to any of an SDT resume procedure, a non-SDT resume procedure, or a connection establishment procedure from the network device.

In some example embodiments, the access reason may be indicated in one of: a radio access control, RRC, setup request; an RRC resume request; or UE assistance information.

In some example embodiments, the indication message may comprise a paging message indicating the terminal device to trigger or initiate the MT-SDT.

In some example embodiments, an apparatus capable of performing any of the method 400 (for example, the network device 120) may include means for performing the respective steps of the method 400. The means may be implemented in any suitable form. For example, the means may be implemented in a circuitry or software module.

In some example embodiments, the apparatus may further comprise means for transmitting, to a terminal device, an indication message indicating the terminal device to initiate a mobile terminated small data transmission (MT-SDT); and means for receiving, from the terminal device, an indication of an access reason of a connection attempt to the network device.

In some example embodiments, the access reason may comprise one or more of: a condition for the MT-SDT was not fulfilled; the connection attempt for the MT-SDT failed; a mobile terminated (MT) access; or an MT-SDT.

In some example embodiments, the connection attempt may comprise one of: an SDT resume procedure; a non-SDT resume procedure; or a connection establishment procedure.

In some example embodiments, the indication of the access reason may be comprised in one of: a radio access control, RRC, setup request; an RRC resume request; or UE assistance information.

In some example embodiments, the apparatus may further comprises means for determining whether to bring the terminal device to a connected mode or not based on the access reason; and transmit, to the terminal device, an indication to bring the terminal device 110 to the connected mode.

In some example embodiments, the indication message may comprise a paging message indicating the terminal device to trigger or initiate the MT-SDT.

In some example embodiments, the apparatus may further comprises means for prioritizing plurality of connection attempts from a plurality of terminal devices based on access reasons of the plurality of connection attempts, wherein the plurality of terminal devices comprise the terminal device.

In some example embodiments, the apparatus may further comprise means for prioritizing connection attempts from a plurality of connection attempts based on the access reasons of the connection attempts.

In some example embodiments, the network device 120 may further comprise means for handling connection attempts from the plurality of connection attempts based on the access reasons of the connection attempts, wherein the connection attempts are prioritized based on their respective critical degree.

Figure 5:
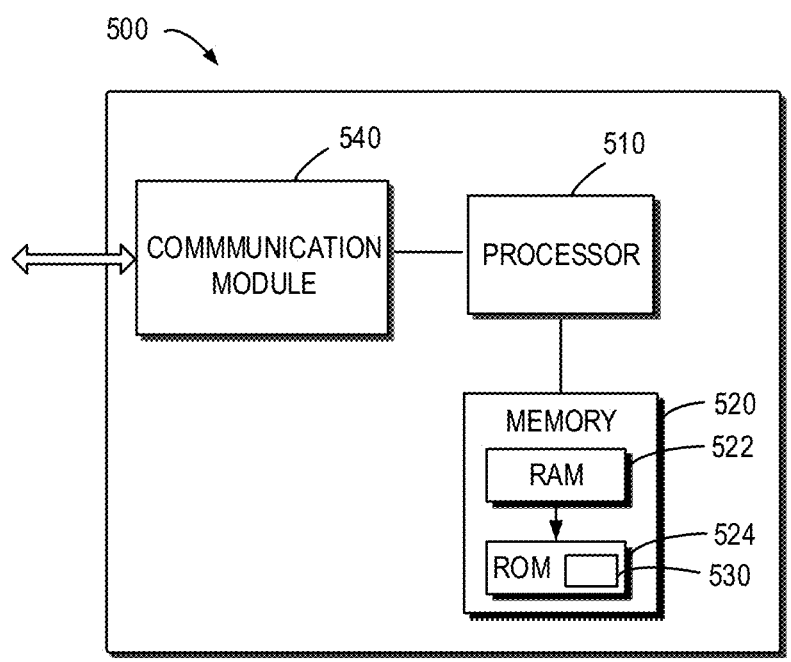
FIG. 5 illustrates an example simplified block diagram of a device that is suitable for implementing embodiments of the present disclosure.

FIG. 5 is a simplified block diagram of a device 500 that is suitable for implementing embodiments of the present disclosure. The device 500 may be provided to implement the communication device, for example the terminal device 50 or the network device 120 as shown in FIG. 1. As shown, the device 500 includes one or more processors 510, one or more memories 520 coupled to the processor 510, and one or more transmitters and/or receivers (TX/RX) 540 coupled to the processor 510.

The TX/RX 540 is for bidirectional communications. The TX/RX 540 has at least one antenna to facilitate communication. The communication interface may represent any interface that is necessary for communication with other network elements. The communication interface may be hardware or software based interface. For example, the communication interface may be one or more transceivers. The one or more transceivers may be coupled to one or more antennas or antenna ports to wirelessly transmit and/or receive communication signals. The antennas or antenna ports may be the same or different types. The antennas or antenna ports may be located in different positions of an apparatus. The one or more transceivers allow the apparatus to communicate with other devices that may be wired and/or wireless. The transceiver may support one or more radio technologies. For example, the one or more transceivers may include a cellular subsystem, a WLAN subsystem, and/or a Bluetooth™ subsystem. The one or more transceivers may include processors, controllers, radios, sockets, plugs, buffers, or the like circuits to form one or more communication channels to one or more radio frequency units.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a read only memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 524. The processor 510 may perform any suitable actions and processing by loading the program 530 into the RAM 522.

The embodiments of the present disclosure may be implemented by means of the program so that the device 500 may perform any process of the disclosure as discussed with reference to FIG. 2. The embodiments of the present disclosure may also be implemented by hardware or by a combination of software and hardware.

In some example embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like.

Figure 6:
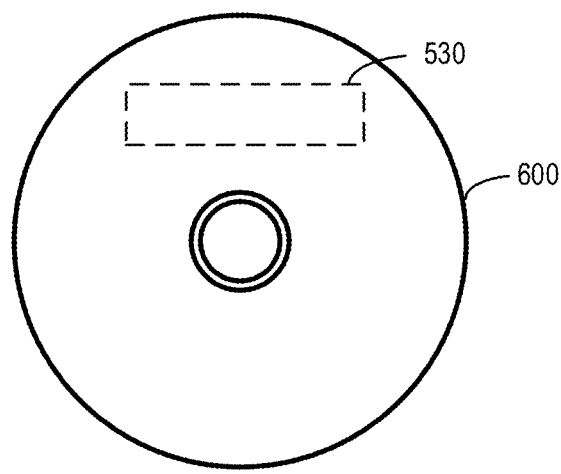
FIG. 6 illustrates an example block diagram of an example computer readable medium in accordance with some embodiments of the present disclosure.

FIG. 6 shows an example of the computer readable medium 600 in form of CD or DVD. The computer readable medium has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 or 400 as described above with reference to FIG. 3 and FIG. 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device, comprising:
   at least one processor; and
   at least one memory storing instructions that, when executed by the at least one processor, cause the terminal device to:
   receive, from a network device, an indication message indicating the terminal device to initiate a mobile terminated small data transmission, MT-SDT; and
   indicate an access reason of a connection attempt to the network device based on an operation status of the connection attempt, wherein the access reason comprises one or more of:
      a condition for the MT-SDT was not fulfilled;
      the connection attempt for the MT-SDT failed;
      a mobile terminated, MT, access; or
      an MT-SDT.

2. The terminal device of claim 1, wherein the terminal device is further caused to:
   determine the access reason based on the operation status, wherein the operation status comprises one or more of:
      a fulfillment situation of a condition for the MT-SDT; or
      types of resources available for the connection attempt.

3. The terminal device of claim 2, wherein the resources available for the connection attempt comprises one or more of:
   resources for configured grant SDT, CG-SDT;
   resources for random access, RA-SDT; or
   common random access channel, RACH, resources.

4. The terminal device of claim 3, wherein the access reason is determined as:
   an MT-SDT, in an instance in which the resources for CG-SDT or the resources for RA-SDT are used; or
   an MT access or an MT-SDT, in an instance in which the common RACH resources are used.

5. The terminal device of claim 2, wherein the access reason is determined as:
   an MT-SDT, in an instance in which the condition for the MT-SDT is fulfilled; or
   an MT access or an MT-SDT, in an instance in which the condition for the MT-SDT is not fulfilled.

6. The terminal device of claim 1, wherein the connection attempt comprises one of:
   an SDT resume procedure;
   a non-SDT resume procedure; or
   a connection establishment procedure.

7. The terminal device of claim 1, wherein the terminal device is further caused to:
   initiate the connection establishment procedure after indicating the access reason to the network device,
   wherein the connection establishment procedure is triggered by the network device to bring the terminal device to a connected state.

8. The terminal device of claim 1, wherein the terminal device is further caused to:
   initiate an SDT resume procedure as the connection attempt; and
   continue the connection attempt as a non-SDT resume procedure in an instance in which the condition for the MT-SDT is not fulfilled.

9. The terminal device of claim 8, wherein the terminal device is further caused to:
   enter to a connected state upon receiving a response to any of an SDT resume procedure, a non-SDT resume procedure, or a connection establishment procedure from the network device.

10. The terminal device of claim 1, wherein the terminal device is further caused to:
   initiate an SDT resume procedure as the connection attempt; and
   stop the SDT resume procedure and initiate a non-SDT resume procedure in an instance in which the condition for the MT-SDT is not fulfilled.

11. The terminal device of claim 1, wherein the terminal device is further caused to:
   enter an idle mode in an instance in which the condition for the MT-SDT is not fulfilled; and
   initiate a connection establishment procedure.

12. The terminal device of claim 1, wherein the access reason is indicated in one of:
   a radio access control, RRC, setup request;
   an RRC resume request; or
   user equipment, UE, assistance information.

13. The terminal device of claim 1, wherein the indication message comprises a paging message indicating the terminal device to trigger or initiate the MT-SDT.

14. A network device, comprising:
   at least one processor; and
   at least one memory storing instructions that, when executed by the at least one processor, cause the network device to:
   transmit, to a terminal device, an indication message indicating the terminal device to initiate a mobile terminated small data transmission, MT-SDT; and
   receive an indication of an access reason of a connection attempt, wherein the access reason comprises one or more of:
      a condition for the MT-SDT was not fulfilled;
      the connection attempt for the MT-SDT failed;
      a mobile terminated, MT, access; or
      an MT-SDT.

15. The network device of claim 14, wherein the connection attempt comprises one of:
   an SDT resume procedure;
   a non-SDT resume procedure; or
   a connection establishment procedure.

16. The network device of claim 14, wherein the indication of the access reason is comprised in one of:
   a radio access control, RRC, setup request;
   an RRC resume request; or
   user equipment, UE, assistance information.

17. The network device of claim 14, wherein the network device is further caused to:
   determine to bring the terminal device to a connected mode or not based on the access reason; and
   transmit, to the terminal device, an indication to bring the terminal device to the connected mode.

18. The network device of claim 14, wherein the indication message comprises a paging message indicating the terminal device to trigger or initiate the MT-SDT.

19. The network device of claim 14, wherein the network device is further caused to:
   prioritize a plurality of connection attempts from a plurality of terminal devices based on access reasons of the plurality of connection attempts, wherein the plurality of terminal devices comprise the terminal device.

20. The network device of claim 14, wherein the network device is further caused to:
   prioritize connection attempts from a plurality of connection attempts based on the access reasons of the connection attempts.

21. The network device of claim 19, wherein the network device is further caused to:
   handle connection attempts from the plurality of connection attempts based on the access reasons of the connection attempts, wherein the connection attempts are prioritized based on their respective critical degree.

22. A method at a terminal device, comprising:
   receiving, from a network device, an indication message indicating the terminal device to initiate a mobile terminated small data transmission, MT-SDT; and
   indicating an access reason of a connection attempt to the network device based on an operation status of the connection attempt, wherein the access reason comprises one or more of:
      a condition for the MT-SDT was not fulfilled;
      the connection attempt for the MT-SDT failed;
      a mobile terminated, MT, access; or
      an MT-SDT.

23. A method at a network device, comprising:
   transmitting, to a terminal device, an indication message indicating the terminal device to initiate a mobile terminated small data transmission, MT-SDT; and
   receiving an indication of an access reason of a connection attempt to the network device, wherein the access reason comprises one or more of:
      a condition for the MT-SDT was not fulfilled;
      the connection attempt for the MT-SDT failed;
      a mobile terminated, MT, access; or
      an MT-SDT.

* * * * *